United States Patent
Brown, Jr. et al.

(10) Patent No.: US 6,450,611 B1
(45) Date of Patent: Sep. 17, 2002

(54) INK JET SWATH PREDICTION METHOD

(75) Inventors: Martin Joseph Brown, Jr.; Cuong Manh Hoang; David Brian Langer, all of Lexington; David William Murphy, Nicholasville; Gary Scott Overall, Lexington; Martin Geoffrey Rivers, Lexington; Ronald Todd Sellers, Lexington; Bryan Scott Willett, Lexington, all of KY (US)

(73) Assignee: Lexmark International, Inc., Lexington, KY (US)

( * ) Notice: Subject to any disclaimer, the term of this patent is extended or adjusted under 35 U.S.C. 154(b) by 23 days.

(21) Appl. No.: 09/783,572

(22) Filed: Feb. 14, 2001

(51) Int. Cl.⁷ .......................... B41J 23/00; B41J 29/393
(52) U.S. Cl. ............................................ 347/37; 347/19
(58) Field of Search ............................. 347/37, 19, 16, 347/14

(56) References Cited

U.S. PATENT DOCUMENTS

| | | |
|---|---|---|
| 4,144,547 A | 3/1979 | Stoffel |
| 4,193,096 A | 3/1980 | Stoffel |
| 4,954,968 A | 9/1990 | Yamaguchi et al. |
| 5,220,440 A | 6/1993 | Hisatake |
| 5,298,990 A | 3/1994 | Otaka et al. |
| 5,487,119 A | 1/1996 | Kimura et al. |
| 5,524,067 A | 6/1996 | Miyake et al. |
| 5,535,013 A | 7/1996 | Murata |
| 5,596,423 A | 1/1997 | Pritchard |
| 5,636,294 A | 6/1997 | Grosse et al. |
| 5,655,032 A | 8/1997 | Ohsawa et al. |
| 5,689,591 A | 11/1997 | Balram et al. |
| 5,734,753 A | 3/1998 | Bunce |
| 5,740,284 A | 4/1998 | Wober et al. |
| 5,754,192 A | 5/1998 | Sugaya |
| 5,872,897 A | 2/1999 | Jones et al. |
| 5,903,670 A | 5/1999 | Chun et al. |
| 5,920,681 A | 7/1999 | Hori |
| 5,923,820 A | 7/1999 | Cunnagin et al. |
| 5,991,449 A | 11/1999 | Kimura et al. |
| 6,085,028 A | 7/2000 | Takagi et al. |
| 6,217,147 B1 * | 4/2001 | Holstun ....................... 347/40 |

* cited by examiner

*Primary Examiner*—Thinh Nguyen
(74) *Attorney, Agent, or Firm*—Taylor & Aust, P.C.; D. Brent Lambert; Scott N. Barker

(57) ABSTRACT

A method of positioning an ink jet printhead in a printer includes dividing a bitmap into a plurality of rows of tiles. A subset of the rows of tiles to be printed in a next pass of the printhead is identified. Printable ones of the tiles in the subset of rows are identified. The printable tiles contain printable data. Within each printable tile, a top most location of the printable data and at least one of a left most location of the printable data and a right most location of the printable data are identified. A print medium is advanced in a feed direction until a portion of the print medium corresponding with the top most location of the printable data of at least one printable tile is substantially aligned with a top nozzle of the printhead. The printhead is moved, in a scan direction, directly to a position on the print medium corresponding to one of the left most location of the printable data of at least one printable tile and the right most location of the printable data of at least one printable tile.

22 Claims, 5 Drawing Sheets

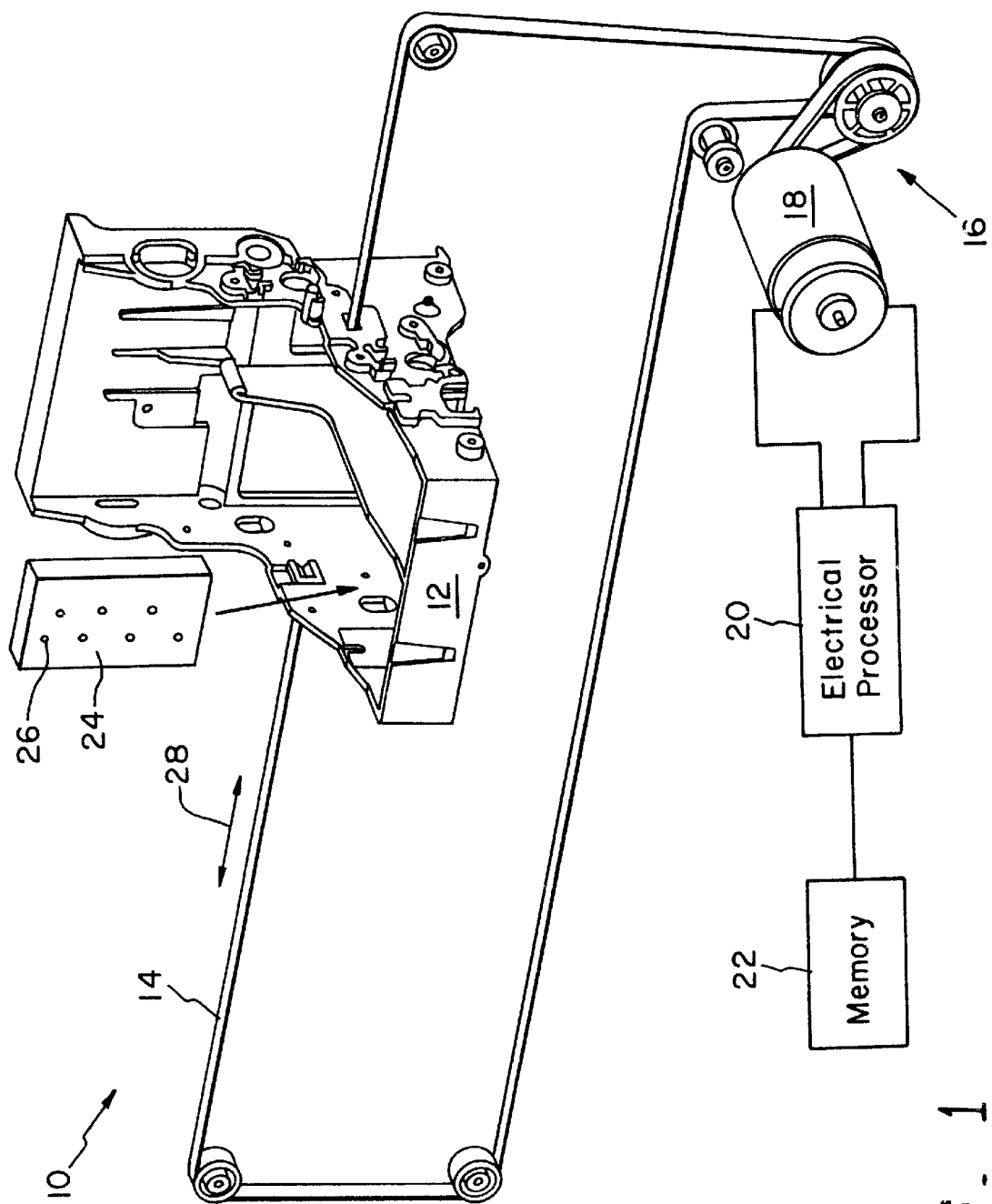

| Start Scan | End Scan | Left Margin | Right Margin |
|---|---|---|---|
| 0 | Y | X | 3X |
| Y | 2Y | X | 3X |
| 2Y | 3Y | X | 3X |
| 4Y | 5Y | 0 | 2X |
| 5Y | 6Y | 0 | 2X |
| 6Y | 7Y | 0 | 2X |

INK JET SWATH PREDICTION METHOD

BACKGROUND OF THE INVENTION

1. Field of the invention

The present invention relates to optimizing carrier movement in an ink jet printer, and, more particularly, to optimizing carrier movement in an ink jet printer with a minimum of memory.

2. Description of the Related Art

A significant performance problem with an ink jet printer is unnecessary carrier movements on a page. Unnecessary carrier movements may result from excess carrier motion at the beginning and end of any given swath or from non-optimal form advancement between swathes. Each of these unnecessary delays causes a reduction in print performance.

On an ink jet printer, printing the job in an optimal time requires knowledge about the characteristics of the current swath being printed plus the next swath. Precise swath prediction requires expansion of the next swath into memory before boundary calculations can be performed. Unfortunately, on a printer that is constrained by memory, it may be impossible to expand more than one swath at a time.

To move the carrier optimally, a way is needed to determine information about the subsequent swath to be printed. On a standard page printer that typically expands the entire page into a bitmap before printing, this would not be a problem, as all of the detailed information for the next swath would be available before launching the current swath. Unfortunately, on a printer that is constrained by memory, it may be impossible to expand more than one swath at a time. The current swath must remain resident in memory until it has completely printed. Therefore, what is needed is a method of predicting the margins for the next swath to be printed which requires less memory or processor bandwidth without significantly sacrificing accuracy of the predicted margins. This predictive data must also contain the information needed to compute optimal form indexing needed to advance the paper beyond white space.

What is needed in the art is a method of minimizing delays resulting from unnecessary carrier movements by optimizing form indexing and carrier movement throughout the page. More particularly, a method is needed to predict the boundaries of the next swath that requires little memory or processor bandwidth without significantly sacrificing accuracy of the predicted boundaries.

SUMMARY OF THE INVENTION

The present invention provides a method of identifying boundaries of a swath to be printed by an ink jet printer with a minimum of memory so that carrier movements can be optimized.

The invention comprises, in one form thereof, a method of positioning an ink jet printhead in a printer. A bitmap is divided into a plurality of rows of tiles. A subset of the rows of tiles to be printed in a next pass of the printhead is identified. Printable ones of the tiles in the subset of rows are identified. The printable tiles contain printable data. Within each printable tile, a top most location of the printable data and at least one of a left most location of the printable data and a right most location of the printable data are identified. A print medium is advanced in a feed direction until a portion of the print medium corresponding with the top most location of the printable data of at least one printable tile is substantially aligned with a top nozzle of the printhead. The printhead is moved, in a scan direction, directly to a position on the print medium corresponding to one of the left most location of the printable data of at least one printable tile and the right most location of the printable data of at least one printable tile.

An advantage of the present invention is that carrier movements in an ink jet printer are optimized while using a minimum of memory and processor bandwidth.

Another advantage is that predicted margins are more accurate.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a perspective, partially exploded view of one embodiment of a carrier drive system that can be used in conjunction with the method of the present invention;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 2B:
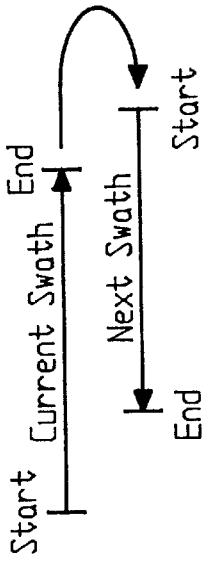
FIG. 2b is a schematic diagram of another possible carrier movement scenario with the method of the present invention.

Referring now to the drawings, and, more particularly, to FIG. 1, there is shown one embodiment of a carrier drive system 10 for performing the method of the present invention. Carrier drive system 10 includes a carrier 12, a carrier belt 14, a transverse drive system 16, a drive motor 18, an electrical processor 20 and a memory device 22. Carrier 12 carries print cartridges (not shown) having respective printheads, one of which is illustrated only schematically and referenced 24. Each of the printheads includes printing elements in the form of ink jetting nozzles 26. Under the control of processor 20, transverse drive system 16 and motor 18 move belt 14 in scan directions indicated by double arrow 28 to thereby cause carrier 12 to scan across a page of print medium. Each of nozzles 26 emits ink as carrier 12 scans across the print medium to thereby produce a respective row or "scan" of pixel elements across the print medium.

Figure 2D:
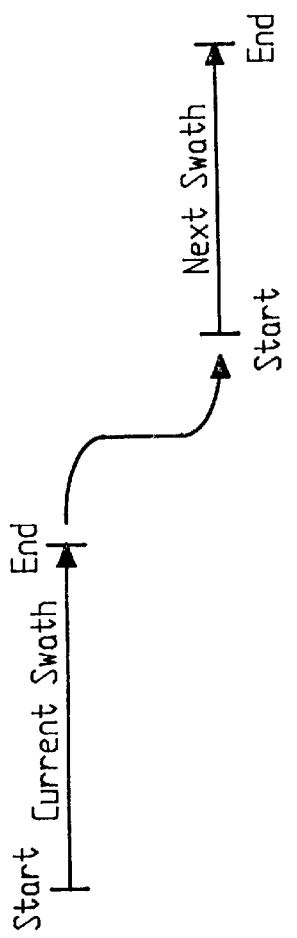
FIG. 2d is a schematic diagram of a further possible carrier movement scenario with the method of the present invention.
Figure 2A:
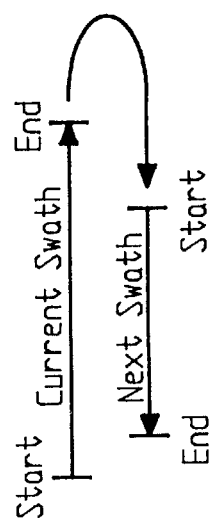
FIG. 2a is a schematic diagram of one possible carrier movement scenario with the method of the present invention.
Figure 2C:
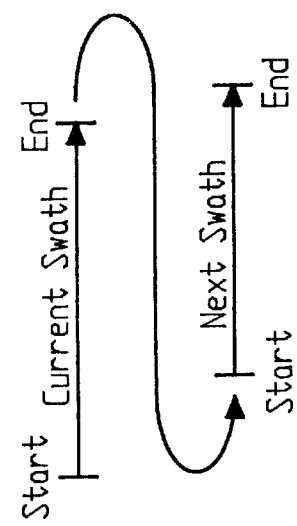
FIG. 2c is a schematic diagram of yet another possible carrier movement scenario with the method of the present invention.

Optimal carrier movement depends on knowledge of the current and subsequent swath to be printed. Each swath provides required information to profile the movement of carrier 12 across the page. This information includes a starting and ending print position of carrier 12. In known printers, as carrier 12 reaches the end print position of a current swath, it decelerates to a stop while waiting for the next swath to be submitted. However, if the information about the next swath is known, carrier 12 could proceed to get into position before ending the carrier movement for the current swath. Possible scenarios are shown in FIGS. 2a–2d. FIGS. 2a and 2b illustrate scenarios in which the printer chooses to print or is commanded to print in either scan direction 28, i.e., from left to right and from right to left. FIGS. 2c and 2d illustrate scenarios in which the printer prints only from left to right.

Figure 3:
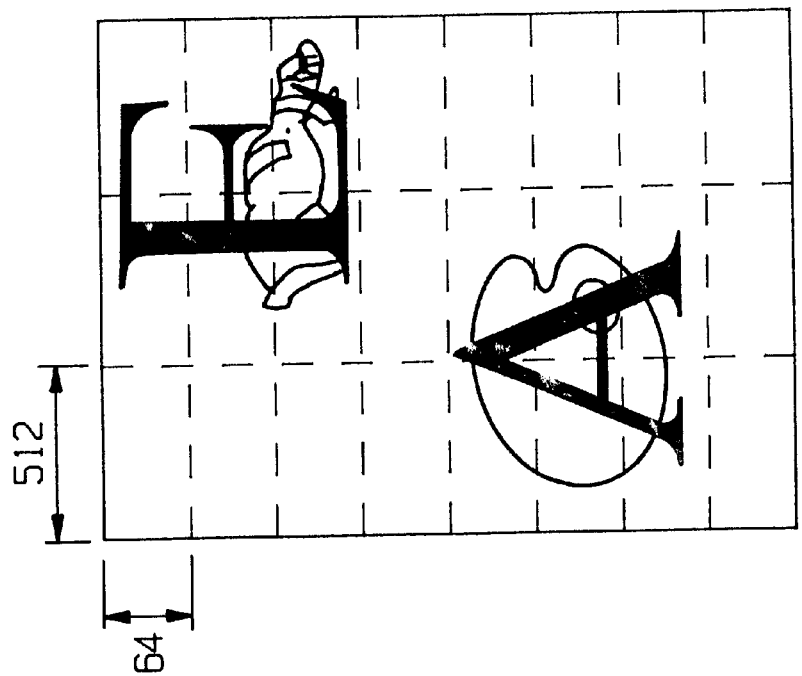
FIG. 3 is a diagram of a bitmap that has been divided into tiles according to one embodiment of the method of the present invention.

The method of the present invention includes three different embodiments: Blank Tile, Bounding Box, and Scan Line based. The Scan Line embodiment includes storing in memory 22 the margins for every scan line on the page. The Blank Tile and Bounding Box embodiments are based on a concept of breaking the page's bitmap into smaller tiles, as shown in FIG. 3. Each tile contains a portion of the page's bitmap that is X picture elements wide by Y picture elements tall. Each tile also has a descriptor that indicates whether the tile is blank or not. Using either the information in the tile or the blank status of the tile, predictions about future swathes to be printed can be made for optimal carrier movements.

A printhead 24 may have more than Y nozzles spaced along the paper feed direction. For example, a printhead 24 having 320 nozzles spaced apart in the paper feed direction is capable of simultaneously printing five rows or "bands" of tiles that are each 64 picture elements tall.

Each embodiment of the prediction method of the present invention attempts to accurately predict the left and right margins along with the form advancement for the next swath. The closer the predicted form advancement is to getting the printable data to the top of the printhead, the fewer the number of wasted carrier movements that must be taken. In addition, the closer the predicted left and right margins are to the actual printed margins, the fewer wasted carrier movements occur. All of these together increase the overall Pages Per Minute speed of the printer.

All embodiments of the method of the present invention help towards achieving the goal of optimal printing speed, but each has its advantages and disadvantages. Each of the three embodiments described herein has a different level of accuracy and requires a different level of processor intensity and varying amounts of memory. Both the accuracy and the required processing power is highest with Scan Line based predictions and lowest with Blank Tile based, with the Bounding Box based falling in between.

Figure 7:
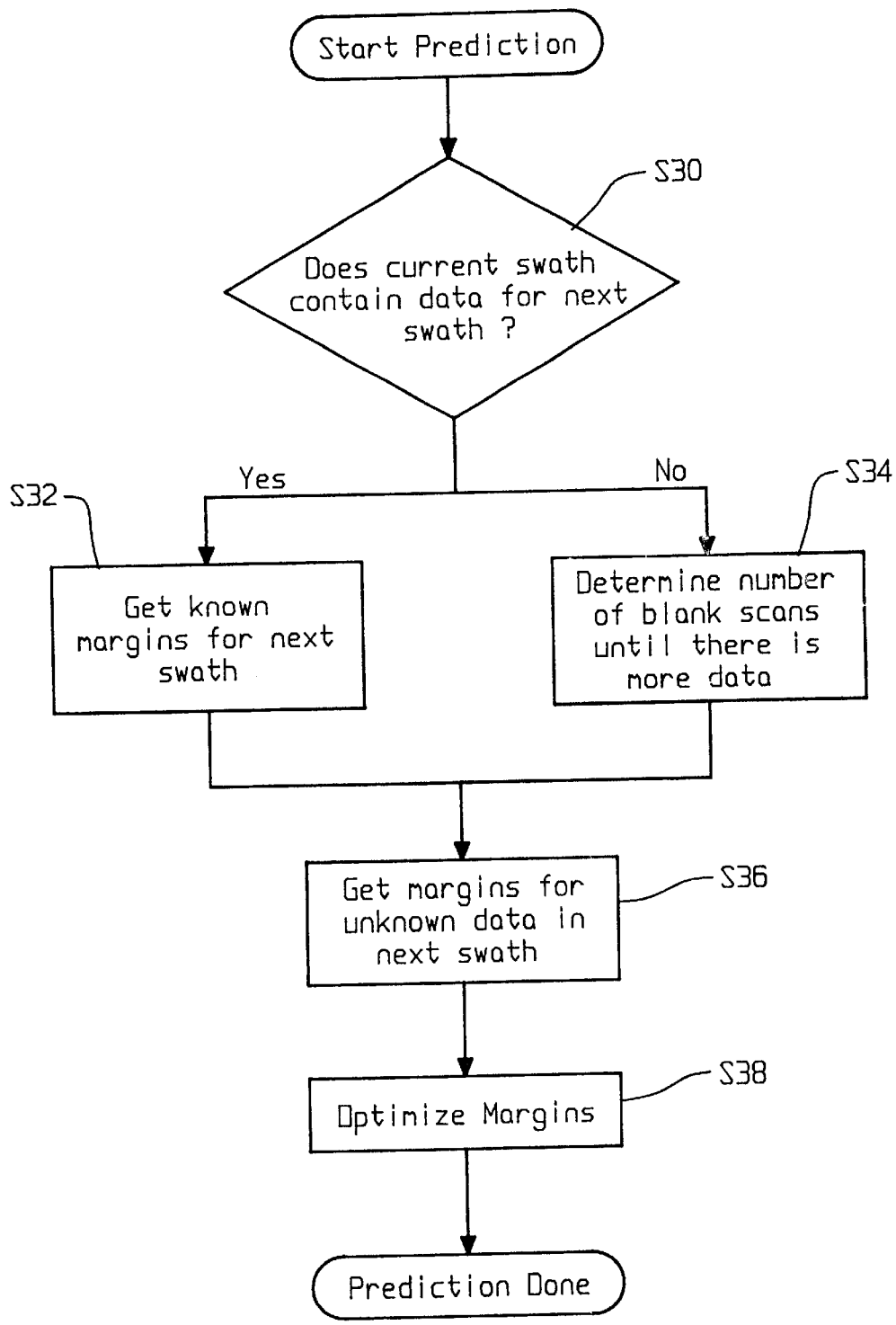
FIG. 7 is a flow diagram of the swath prediction method of the present invention.

The overall flow of swath prediction (FIG. 7) is the same for each of the three embodiments of the present invention. It is determined whether the current swath contains data for the next swath (Step S30). If the current swath does contain data needed for the next swath, which is only the case when shingling, the known margins for the next swath are obtained (Step S32). If the current swath does not contain data needed for the next swath, the number of blank scans until there is more data is determined (Step S34). Next, in either case, margins for as yet unanalyzed data in the next swath are obtained (Step S36). Utilizing the margin data for each color plane, the predictive margins are optimized using the printhead locations and which colors are required for the next swath (Step S38).

Once the predictive information is stored in memory 22 and passed on to the print engine in electrical processor 20, the engine uses this information to profile the next carrier movement. That is, carrier 12 is moved to a position on the print medium that corresponds to either the left margin of a left most one of the tiles to be printed in a next swath or the right margin of a right most one of the tiles to be printed in a next swath, depending upon the scan direction of carrier 12. Moreover, the print medium is advanced in a paper feed direction to a position whereat a top active nozzle 26 on a printhead 24 is aligned with a top margin of a top most one of the tiles to be printed in a next swath. "Top active nozzle" is defined herein as the top most nozzle that will emit ink during the next pass or scan of the printhead across the print medium. The paper feed direction may be perpendicular to scan directions 28, however, this is not required.

Figure 4:
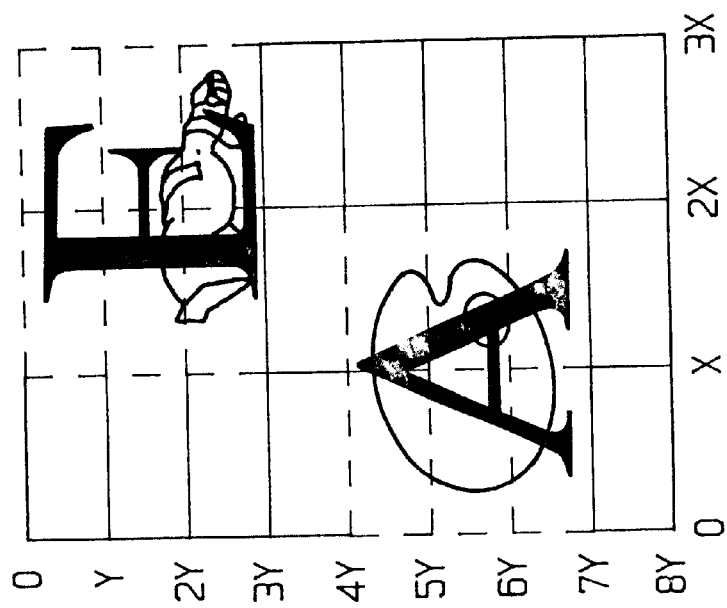
FIG. 4 is a diagram showing the margins for FIG. 3 when using Blank Tile based swath prediction.

In the Blank Tile based embodiment of swath prediction, when the tiles are not storing any printable data, they are marked as blank. Based on this, the margins can roughly be determined for a row of tiles. Knowing how many rows it takes to create a swath and the starting row, the overall margins can be determined for a given swath. FIG. 4 shows the margins for FIG. 3 when using Blank Tile based swath prediction. As can be seen, the left and right margins for the upper region are X and 3X, respectively. The lower region margins are 0 for the left margin and 2X for the right margin.

Figures 5, 6:
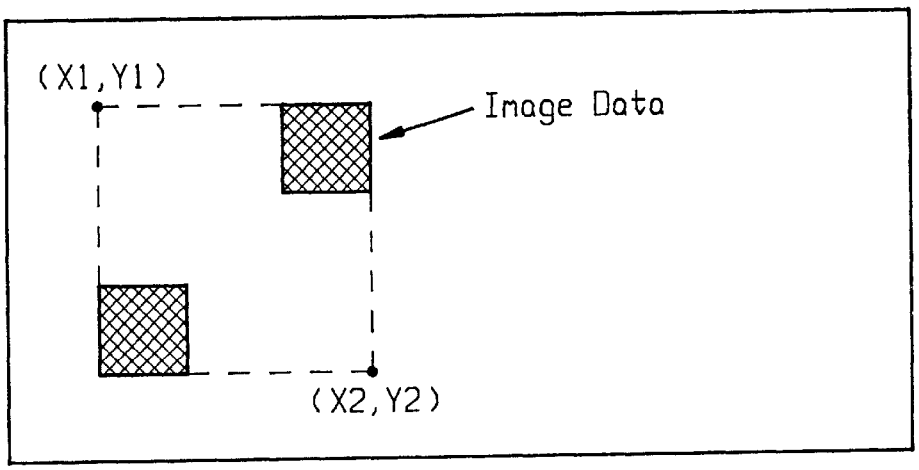
FIG. 5 is a table of the predicted margins of FIG. 4.
FIG. 6 is a diagram of a bounding box used in Bounding Box based swath prediction.

In the Blank Tile based swath prediction method, assuming that the print head is Y scans high, the predicted margins for the swathes are as shown in FIG. 5. The prediction for scans 3Y to 4Y are skipped because blank swathes will not be printed. Predictions will always skip blank regions on the outside of the printable regions and only report non-blank data to be printed.

An advantage of Blank Tile based predictions is the minimal processing power required to create swath predictions. But the biggest limitation is the granularity of the margins, which can lead to longer deceleration distances for carrier 12 and shorter form advances. A possible worst case would be an extra X−1 distance of extra head movement and a form advance that stops a distance Y−1 too short.

Bounding Box prediction is similar to Blank Tile based prediction in that it is based on the tiles. The smallest possible rectangle that has two sides parallel to scan directions 28 and that contains all of the printable data within a tile is referred to herein as a "Bounding Box". Bounding Box coordinates are determined for every tile. That is, the x and y locations of the upper left and lower right positions of the Bounding Box within every tile are determined, as shown in FIG. 6, for the entire page.

Processor 20 within the printer uses the Bounding Box location data from a row of tiles to determine not only the left most and right most margins of the Bounding Boxes in each row, but also the top most and bottom most margins of the Bounding Boxes. Using this, blank scans can more accurately be skipped, resulting in a higher number of pages per minute. More particularly, carrier 12 is moved to a position on the print medium that corresponds to either the left margin of a Bounding Box of the left most one of the tiles to be printed in the next swath or the right margin of a Bounding Box of the right most one of the tiles to be printed in the next swath, depending upon the scan direction of carrier 12. Moreover, the print medium is advanced in the paper feed direction to a position whereat a top nozzle 26 on a printhead 24 is aligned with a top margin of a Bounding Box of a top most one of the tiles to be printed in a next swath.

Now the printer has a general map of the print data. When prediction data is requested, the information is always known and is more accurate than with Blank Tile predictions. Increased processing time is required in Bounding Box prediction to get this information for every tile on a page. For this reason, this data can be collected on a host computer to be sent down with a print job. The data can also be generated on the printer itself.

Scan Line based swath prediction is simple in nature. For every scan line on the page, a left margin and a right margin are obtained which describe the left and right most positions of data on that scan. Scan Line based prediction is the most accurate of all, as there is no ambiguity when determining the form advancement or margins. Scan Line based prediction requires a greater amount of time to parse the page bitmap to determine this information, and requires a greater amount of memory to store this information.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of positioning an ink jet printhead in a printer, said method comprising the steps of:

dividing a bitmap into a plurality of rows of tiles;

identifying a subset of said rows of tiles to be printed in a next pass of the printhead;

identifying printable ones of said tiles in said subset of rows, said printable tiles containing printable data;

identifying within each said printable tile a top most location of said printable data and at least one of a left most location of said printable data and a right most location of said printable data;

advancing a print medium in a feed direction until a portion of the print medium corresponding with the top most location of said printable data of at least one said printable tile is substantially aligned with a selected nozzle of said printhead; and moving the printhead in a scan direction directly to a position on the print medium corresponding to one of said left most location of said printable data of at least one said printable tile and said right most location of said printable data of at least one said printable tile.

2. The method of claim 1, wherein each of said tiles is substantially rectangular.

3. The method of claim 1, wherein each said tile has two opposite sides substantially parallel to the scan direction.

4. The method of claim 1, wherein each of said rows of tiles is aligned substantially parallel to the scan direction.

5. The method of claim 1, comprising the further step of identifying within each said printable tile a bottom most location of said printable data, said top most location of said printable data, said bottom most location of said printable data and said at least one of a left most location of said printable data and a right most location of said printable data partially define a bounding box surrounding said printable data within said tile.

6. The method of claim 5, wherein said bounding box includes four corners, said method comprising the further step of determining coordinates of two opposite ones of said four corners.

7. The method of claim 1, wherein said advancing step is performed until the portion of the print medium corresponding to the top most location of said printable data of at least one said printable tile is substantially aligned in the scan direction with said selected nozzle of said printhead.

8. The method of claim 1, wherein said selected nozzle comprises a top active nozzle of said printhead.

9. The method of claim 1, wherein said top most location comprises a top most location of said printable data of all of said tiles in said subset of rows.

10. The method of claim 1, wherein said left most location comprises a left most location of said printable data of all of said tiles in said subset of rows.

11. The method of claim 1, wherein said right most location comprises a right most location of said printable data of all of said tiles in said subset of rows.

12. The method of claim 1, wherein said moving step is performed without emitting ink from the printhead.

13. A method of printing with an ink jet printhead, said method comprising the steps of:

dividing a bitmap into a plurality of rows of tiles;

identifying a subset of said rows of tiles to be printed in a next pass of the printhead;

identifying printable ones of said tiles in said subset of rows, said printable tiles containing printable data;

advancing a print medium in a feed direction; and moving the printhead directly to a position on the print medium corresponding to a beginning of a first one of said printable tiles to be printed.

14. The method of claim 13, wherein each of said printable tiles has a left margin and a right margin, said moving step including moving the printhead directly to a position on the print medium corresponding to a left most one of said left margins.

15. The method of claim 13, wherein each of said printable tiles has a left margin and a right margin, said moving step including moving the printhead directly to a position on the print medium corresponding to a right most one of said right margins.

16. The method of claim 13, wherein each of said printable tiles has a top margin, said advancing step including aligning a portion of the print medium corresponding to a top most one of said top margins with a top nozzle of the printhead.

17. The method of claim 13, comprising the further step of emitting ink from the printhead immediately after said moving step.

18. A method of positioning an ink jet printhead in a printer, said method comprising the steps of:

dividing a bitmap into a plurality of rows of tiles;

identifying a subset of said rows of tiles to be printed in a next pass of the printhead;

identifying printable ones of said tiles in said subset of rows, said printable tiles containing printable data;

identifying within each said printable tile a top most location of said printable data; and advancing a print medium in a feed direction until a portion of the print medium corresponding with the top most location of said printable data of at least one of said printable tiles is substantially aligned with a top nozzle of said printhead.

19. A method of positioning an ink jet printhead in a printer, said method comprising the steps of:

dividing a bitmap into a plurality of rows of tiles;

identifying a subset of said rows of tiles to be printed in a next pass of the printhead;

identifying printable ones of said tiles in said subset of rows, said printable tiles containing printable data;

identifying within each said printable tile at least one of a left most location of said printable data and a right most location of said printable data; and 20. A method of positioning an ink jet printhead in a printer, said method comprising the steps of:

providing print data to be printed by the printhead;

identifying a subset of the print data that is to be printed in a future pass of the printhead across a print medium; and controlling movement of the printhead in a current pass of the printhead dependent upon the subset of the print data.

21. The method of claim 20, wherein the future pass of the printhead is to immediately follow the current pass of the printhead.

22. The method of claim 20, wherein the future pass of the printhead and the current pass of the printhead are each in a scan direction.

* * * * *